United States Patent [19]
Lucas

[11] Patent Number: 5,397,045
[45] Date of Patent: Mar. 14, 1995

[54] TAPE STAPLER

[75] Inventor: Antonio Lucas, Pamplona, Spain

[73] Assignee: Siems-Senco, S.A., Elcano

[21] Appl. No.: 53,383

[22] Filed: Apr. 28, 1993

[30] Foreign Application Priority Data

Apr. 29, 1992 [EP] European Pat. Off. ............ 92500049

[51] Int. Cl.⁶ .............................................. B65B 27/10
[52] U.S. Cl. ...................................... 227/21; 227/105;
227/143; 227/145
[58] Field of Search ................ 227/21, 105, 106, 142,
227/145, 143; 225/53, 56, 88

[56] References Cited

U.S. PATENT DOCUMENTS

| | | | |
|---|---|---|---|
| 2,959,155 | 11/1960 | Powers et al. | 173/115 |
| 3,050,224 | 8/1962 | Drolshammer | 225/88 |
| 3,231,169 | 1/1966 | Jorgensen | 227/143 |
| 3,596,820 | 8/1971 | Lou | 227/106 |
| 4,184,620 | 1/1980 | Ewig | 227/146 |
| 4,821,937 | 4/1989 | Rafferty | 227/142 |

FOREIGN PATENT DOCUMENTS

2221770 11/1970 Australia.
6407364 12/1965 Netherlands.
2001292 7/1978 United Kingdom.

*Primary Examiner*—Eugenia Jones
*Assistant Examiner*—Allan M. Schrock
*Attorney, Agent, or Firm*—Browdy and Neimark

[57] ABSTRACT

A tape stapling device made up of a body (1) with a container or store for a reel of tape, an upper framework (2) connected to the body, with a staple loader (18) housed inside it and with a lever (3,6) and an arm (4) secured to and pivoting on the said framework (2). The end of the arm (4) includes a mechanism which takes up the tape coming from the container (36) along an open groove, it pulls on the tape, later creating a loop on the inside of the arm (4) and finally it staples and cuts the tape which has already been arranged around the items to be secured.

6 Claims, 10 Drawing Sheets

TAPE STAPLER

BACKGROUND OF THE INVENTION

1. Technical Field

The invention relates to tape stapling tools used in agriculture, among other applications. Tools of this kind have a reel of tape which is made to encircle or wrap around a group of branches, twigs, etc. so that once they are encircled, the tape is stapled together around the group or bunch of branches or twigs, which are thus fastened together.

2. Prior Art

In a known tool of this type, there is a tape stapler manufactured in Japan and commercialized under the brand name MAX TAPENER, which has been on the market for more than twenty years. It is made up of a lower body which houses a reel of tape and on which is mounted a stapling device. See Patent CH-A-535101.

The tape that comes from the reel runs towards the front part of the tool where the staple holder device also appears, with a blade or knife to cut the tape once that the loop has been made around the group or bunch also being situated in this front part.

Over the said lower body is arranged an arm which pivots on it and which is operated by a lever, with this arm usually being curved or arc-shaped. The free end of this arm includes a mechanism which, on the arm pivoting towards the front part of the lower body, takes up the end of the protruding tape and pulls on it, then opening again to provide a stretch of tape that closes or covers the gap between the arm and the lower body.

With the arm open, the items to be taped together are housed inside the arc-shaped arm, than forming a loop of tape in the space between the arm and the lower body. Having reached this position, the lever is operated, thus closing the arm and causing the end of the tape being held by the arm to approach the portion coming from the reel through the lower body. Next, the arm mechanism releases the tape, staples together the two ends of the tape and cuts its two-ends, leaving them joined together to form a loop.

The mechanism at the end of the arc-shaped arm is known in itself and from its most outer part towards its interior it has four projections protruding downwards. The most exterior of these has a vertical movement on coming up against a forward projection on the lower body. In the movements of the arm, on being operated by means of the lever, this projection withdraws towards the interior of the mechanism and alters the position of a second projection that moves forwards and backwards. On the first movement, the second projection, being in the forward position, is made to move backwards, and on the second movement, with the projection being in the backward position, is made to move forwards.

Apart from these two projections, the arm mechanism is provided with a third fixed projection, on which the second projection impinges on its backwards movement. This third projection is provided with a transverse hole, in which the point that stands out from the lower end of the second projection is received, so as to take up the tape coming from the lower body.

The most inner projection is fixed and has a horizontal base, in which there are two recesses to receive the points of the staples which are to be found in the staple holder or loader housed in the lower body.

The end of the tape coming from the lower body juts upwards in the proximity of the front end of the said lower body, just behind the stop that the forward projection of the mechanism in the arc-shaped arm comes up against and inside a forward section of the staple loader that protrudes from the lower body. This end of the tape is taken up between the second projection in the arm mechanism and the third fixed projection and is released after the second projection moves forward when the arm is operated again.

From the front end of the lower body a blade or knife protrudes upwards, with this blade emerging from inside the forward section of the staple loader and towards the projections from the mechanism in the arc-shaped arm, more specifically between the third and fourth fixed projections.

The fourth projection of the mechanism in the arc-shaped arm remains substantially above the outlet for the staples coming from the staple loader in the position of the arm closed over the lower body.

The staple loader, holder or feeder is assembled inside the upper section of the lower body and is of the conventional type commonly used for stapling. The loader is mounted on a spring situated in the interior of the lower body, in such a way that in the normal position its front end is raised.

The front end of the staple loader finishes in a stop that makes contact with the most forward staple, and a vertical part protrudes from the bottom of lower body and is directed upwards just below the base of the first staple, each staple being "U"-shaped with the opening upwards.

In the descending movement of the arc-shaped arm, the end of the staple loader is forced downwards, thus overcoming the action of the spring, with which the cutting blade protrudes upwards and cuts the tape. At the same time, the vertical part mentioned in the previous paragraph forces the first staple against the fourth projection, by way of an anvil, of the mechanism of the arc-shaped arm, with which the staple is closed.

These tape stapling tools which are already known have several disadvantages, among which the following can be pointed out:

The container for the reel of tape is situated in the lower body, more specifically in a lower casing which is usually made of plastic material. This container has a laterally articulated cover and its base has a central boss which houses in a hole cut in the cover. From this container, the tape runs along an elongated cavity made in the lower body itself, with the tape running along this until its front end travels freely. This elongated cavity has a hinged cover.

The arrangement of the hinged or articulated covers on the body for the reel of tape and for leading the tape cause frequent breakage of the lower body, as the material becomes weakened in the hinged area due to use.

These known tools usually have a metal strip fastened to the interior of the cavity along which the tape runs and close to its outlet, for the purpose of controlling the outlet of the tape by exerting a certain pressure on it.

The positioning of this metal strip is particularly problematic, given that it is an independent part of the lower body which needs to be situated and fixed in the interior of the said lower body.

On the other hand, the connection between the lower plastic body and the metallic lower base is carried out by means of rivets, which makes the assembly of the two parts more complicated and expensive.

The opening provided by the arc-shaped arm to enable entry of the items to be taped together is always the same, meaning that its use in real cases is limited on not being able to receive certain sizes of the said items.

The staple loader used by the known tape staplers receive the staples from the rear part of the tool, so that it is necessary to totally extract the pusher for the staples through the said rear part, which is an inconvenience because of the difficulty of housing the staples and because of the possibility of the pusher getting lost.

The mechanism at the end of the arc-shaped arm is made up of three basic interlaced parts housed in plastic supports which are inserted in the said ends. Of these three basic parts, two are the forward projection or pusher and the second projection or claw, and the third is another part that acts between the previous two and is provided with a hole or window and a spout with which the action of the mechanism is carried out. In the same way, the plastic supports that hold the mechanism are in their turn connected with another fixing pin for both, which carries out its function in the movements of the pusher and the claw.

This conventional mechanism that raises and lowers the pusher and which makes the claw swing either towards the third projection or bracket or else outwards, has an excessive number of parts, which, although they ensure correct operation, make the whole assembly more expensive.

OBJECTIVES OF THE INVENTION

This invention avoids the disadvantages stated as typical of conventional tools and succeeds in achieving the following objectives.

- A container in the lower body with a free intake for the reel of tape, in which the reel of tape rests freely, thus improving its freedom of movement and making the tape feeding movement easier.
- A cover that covers the intake or access for the reel of tape and at the same time acts as an adjustable controller for the tension of the tape.
- A perfect guideway for the tape.
- A lower body which includes the container for the reel of tape, together with the guideway for the tape, the cover for the intake or access for the reel of tape, as well as the means necessary for connection to the lower base.
- A lower base which is pressure fitted onto the lower body.
- A mechanism that takes up the tape positioned at the end of the pivoting arm.
- A staple loader or feeder slide which makes it easier to load the staples and also provides a pusher which cannot be extracted from the loader, with which its possible loss is prevented.
- A lever and arc-shaped arm assembly which enables the opening of the arc-shaped arm to be regulated at will and in accordance with the needs of application.

SUMMARY OF THE INVENTION

To put these objectives into practice, the tape stapler claims a lower body, preferably made of plastic material, almost triangular in shape and of suitable thickness, with a straight upper side on which the lower base is situated, another side, concave towards the exterior, in which the guideway or groove for the tape and the intake or access for the reel of tape are situated, and a third side, which is convex towards the exterior.

The lower intake for the reel of tape which gives access to a circular-shaped internal container or chamber, is open, so that the reel of tape can be inserted with complete ease. The container for the reel of tape receives in its interior a metal strip which slides along inside slots cut in the opposite inner side faces of the container. The sides of this strip are housed in the these slots and slide along them, with the slots extending along the internal walls of the intake for the reel of tape, so that the strip can be made to slide to one side, thus becoming concealed inside the container, or towards the other side, thus covering the intake for the reel.

The slots along which the strip slides are close to the internal perimeter of the container or chamber and also close to the edges of the inner walls of the intake for the reel. The intake is situated in the lowest part of the lower body, between an end protuberance on the convex side of the container and a front wall, from which the guided outlet of the tape coming from the reel starts. This outlet is a lateral groove or guideway, open towards one of the side faces of the lower body and finishing at the front part of the said body.

The internal wall of the container or chamber for the reel which is near the previously mentioned wall is established in the way of an inclined plane forming an angle with the outlet direction for the tape and with the strip itself in its closed position. According to the position of the strip, completely closed, almost closed . . . etc., the tape is pressed by the strip against the inclined plane with greater or lenses pressure, so that the tape offers more or less resistance to its extraction. This particular point is advantageous as it allows the tool to be adapted for different types of tapes and, more importantly, it makes it easier for the tool to be able to tightly encircle the tape around the items to be fastened together, as will be explained later.

The insertion of the reel of tape into the lower-body and its storage there is made easier by only having to draw back the strip until it reaches its rear stop and then closing the said strip until it reaches its stop on the front wall, once that the said reel has been inserted into the container.

The lower body is provided with a wide gap or hole close to and forward of the reel storage area, so that the operator's fingers can be inserted, and the upper edge of the said lower body is straight and receives the lower base or frame. Two "L"-shaped flanges, directed towards the forward part of the tool, protrude from this upper edge, forming a whole part of the lower body, which is preferably made of plastic.

The forward flange is centered on the upper edge and the rear one is double and is placed at both sides of the lower body. The horizontal wings or arms of both are arranged at the same height so that they can receive the thickness of the lower base part or framework.

The framework is a metallic part with an open "U"-shaped cross section, facing upwards, which occupies all the upper edge of the lower body and overhangs its forward section.

In the base of the framework can be observed an opening to receive the forward flange from the lower body, and at the sides of the rear section appear two windows in which the side flanges from the lower body become lodged.

The two side flanges are each of a special shape. They are provided with recesses in the centers of their outer faces and wedge-shaped forward ends opening out towards the rear, The recesses receive the sides of the rear part of the framework between their rear end and the above-mentioned windows, with the wedge-shaped sections of the rear side flanges being lodged in these windows, The height of the flanges from the upper edge is slightly less than the thickness of the framework, so that when the framework is placed on the edge or face which holds the flanges, the framework is moved back in such a way that the thickness of the framework goes below the flanges and becomes fixed by pressure and also secured by the wedge shapes housed in the rear windows of the framework.

The framework shows a forward area which overhangs the forward part of the lower body, in which appears an end elevation which the pusher from the arm mechanism comes up against and a vertical fin behind the stop, which is lower in height than the said stop and to which a toothed cutting blade is fitted in order to cut the tape, as will be explained later.

The sides of the framework are also provided with equal pairs of facing circular holes to receive pins which connect the control lever and the pivoting arm of the tool. In the same way, at the rear part are situated another two facing side holes which receive a pin which will act as a stop for the staple-pusher.

In this way, the framework is situated and fixed onto the lower body by pressure and with an assembly operation which is simple and fast.

The interior of the framework holds a staple loader or holder and feeder, which is secured at the rear part of the said framework by means of the disposition of a guide. This guide is "U"-shaped and has the ends of its wings folded inwards perpendicularly along almost all its length, except for its rear section, which is not folded and where the wings are raised and provided with equally aligned circular holes through which a pin passes to fasten this guide to the framework in such a way that it can pivot on this pin.

The inside of the guide receives a "U"-shaped rail which is open upwards and holds the staples, and between this and the upper folded edges of the guide is situated a staple slide covering strip, which in its forward section is connected to a staple pusher. This assembly of strip and pusher will be referred to as the "pusher" from now on.

Behind the position of the facing holes, the guide is provided with two holes cut in the wings of its profile for its connection to the pusher. This pusher is occupied by a central longitudinal slot in which the forward end of the pusher travels by means of a upper protrusion on the said end being housed in the slot. The other end of the pusher finishes in an area folded to 90 degrees, which receives the end of a rod, which at its other end is housed in a hole in the forward end of the pusher. Between this forward end and the area folded to 90 degrees, the rod is surrounded by a spring.

Close to the Pear end of the pusher, it is equipped with a pair of lateral lugs, which are housed in the rear holes of the guide in the position of the assembled pusher.

The longitudinal slot in the pusher, along which the spout of the forward body of the pusher itself moves, is provided with an upward protrusion made from the same strip material used in its manufacture, with the said protrusion making contact with the rear pin of the guide in order to prevent the pusher from being removed when the stapling device is loaded with staples in the forward part.

The stapling device rests on a spring situated in the base of the framework, so that the forward part of the device remains raised towards the mechanism of the pivoting arm.

As was stated previously, the forward part of the device overhangs at the front, emphasizing at its most outer end the stop for the pusher from the arm, another one further back for the tape cutting blade and a third one even further back by way of a tongue, which serves as a support for the bases of the staples when the staple loader is lowered on the pivoting arm being operated.

The remaining general characteristics of the stapling device are already known in themselves, while pointing out that in this case the loading of staples from the front part and the particular positioning of the pusher in its leading position and when empty, determine the advantages of making loading easier and preventing the loss of the pusher when inserting staples.

The ends of the control lever and of the pivoting arm are fixed by means of shafts through pairs of holes to the framework, with the control lever and the arm also pivoting with each other in turn by means of another shaft that connects them at a certain height, so that on operating the rear end of the lever, the pivoting arm turns, with which its forward end which holds the mechanism that takes up the tape and later pulls on it, staples it and cuts it, turns over and towards the forward end of the framework where the end of the stapling device is situated.

The lever is equipped with an upward projection by way of a hand guard, with this projection being "U"-shaped and situated close to the shaft on which the lever and the arm pivot, and with the said hand guard holding the pivoting arm by means of its side walls.

The invention proposes that the opening of the pivoting arm over the forward part of the tool should be adjustable, by making the opening larger or smaller, so that items of different sized can be received through the said opening in order to be taped together, at the same time as pieces of tape of different lengths can be taken up, according to requirements.

To do this, from the base of the hand guard that clasps the pivoting arm, a centered protrusion or lug is made, which penetrates into the interior of the pivoting arm. In the interior of the pivoting arm is situated a support that rests on the side faces or walls of the said arm, in which a centered, screw-threaded hole is made. This support has more protrusions on its sides which are housed in windows cut in the sides of the pivoting arm.

An Allen screw is fitted into the screw-threaded hole and can move, on being turned, in relation to the support and to the protrusion or lug of the hand guard, as the support and the protrusion are substantially parallel. According to the position of the end of the screw in relation to the protrusion, that is, according to the distance from the end and the protrusion, the pivoting arm opens to a greater or lesser degree.

The pivoting arm is made up of two parallel plates fastened together at a distance from each other by means of spacer pins, so that access to the head of the Allen screw in order to turn it can be carried out with complete ease by means of a fixed spanner, for instance.

When the end of the screw is situated at a greater distance with regard to the protrusion or lug of the hand guard, the pivoting arm opens to a greater dimension with regard to the framework, until the said end comes up against the protrusion or lug. On the contrary, this opening is smaller if the distance between the end of the screw and the protrusion or lug of the hand guard is smaller.

In order to be able to absorb these different positions of the pivoting arm, the lower sides of the lever, which are connected to the front shaft of the framework, have elongated slots which receive the ends of the said shaft with total freedom, in such a way that the said sides move upwards and downwards as the end of the screw and the holed support are moved towards or away from each other.

To make it easier for the arm and the lever to return rapidly, a spring is placed with its base wrapped around the shaft in the framework on which the end of the pivoting arm is connected, with one of its branches over the shaft on which the control lever is secured and with its other branch below the shaft that connects the lever and the pivoting arm. The specific position of the said spring obtains an automatic response of the pivoting arm when pressure on the control lever is released.

The mechanism can produce upward or downward movements of the pusher and consequently the forward or backward movements of the claw, which is, as has been stated, another of the objectives of this invention.

This mechanism is made up of the pusher, the claw, the transverse square flange with a hole and the anvil, all conveniently housed inside a piece of plastic and taken in on one side by means of a plastic cover on the side of one of the members of the pivoting arm and on the other side by the other member. In the same way, two springs are also included in this mechanism, one for the claw and the other for the pusher.

Of the two plastic parts, the main one includes a vertical hollow open on both its sides, in which a helicoidal spring is received, as well as a groove or recess which is open at the lower end and is below the said hollow, in which the ends of the protruding square flange and the anvil are housed. Parallel to the said hollow, the plastic part establishes two slots, one in each of its sides, open downwards and of different depths.

The more forward central slot is of greater depth and houses the claw inside it, whereas the slightly more backward and lateral slot, of less depth, houses the pusher. The lower ends of these parts protrude towards the exterior through the bottom of this part.

The common wall of the slots is provided with two holes. One of these holes is vertical and straight, being situated in the right upper part of the front face, whereas the other is "L"-shaped and is positioned in the left lower part of the front face.

The more backward slot, of less depth, is communicated with the large hollow in the plastic part that includes the helicoidal spring, by means of a side opening that communicates the said slot and the said hollow.

The claw is an elongated part that finishes in a foot with a point or beak and parallel to the pusher and is equipped in its upper rear face with two protruding cylindrical lugs or studs which are housed in the two holes or hollows in the wall between the slots, with one in the vertical, straight hole and the other in the "L"-shaped hole. A spring is taken in on the wall of this slot, wrapped around the upper lug or stud and with one of its arms on the left side wall of the slot and with the other arm on the left section of the lower lug or stud. The action of this spring on the claw produces the natural tendency of this to move towards the pusher, that is, to turn inside the slot towards the right.

The two lugs or studs of the claw protrude from the wall of the forward slot towards the backward slot, in which the said lugs or studs .are housed in slots cut in the pusher.

The pusher is a flat part that fits tight to the walls of the more backward slot in the plastic part, which means that its movements are logically in a vertical direction. This pusher is provided with one straight slot and one triangular shaped slot, which combine and correspond with those in the separating wall of the slots. The pusher is provided with an "L"-shaped side projection, which passes towards the hollow where the helicoidal spring is received. This "L"-shaped projection has a small upward elevation which is housed in the lower part of the helicoidal spring, so that in the lowest position of the pusher the spring is slightly compressed, both when the claw is in the forward and in the backward position.

When the pusher makes contact with the stop on the tool and is raised upwards, it puts pressure on the helicoidal spring, thus compressing it. With the claw in the backward position against the square flange, the lower lug of the claw is housed inside the triangular rectangular shaped slot in the pusher in a backward position inside the said triangular slot. On pressing the pusher against the stop on the tool, the lug or stud moves along the inclined hypotenuse of the slot and makes play with the "L"-shaped hollow at the base of the slot, causing the claw to move forward. When the lug or stud is situated at the other end of the hypotenuse of the triangular slot, the helicoidal spring is compressed and forces the pusher rapidly downwards, which the lower lug or stud of the claw is taken in by a small upward recess cut at the right angle corner or vertex of the triangular slot of the said pusher in a stable position. This position corresponds to that of the claw in its forward position.

To return the claw from this position to that of its backward position, the pusher makes contact with the stop of the tool and the lower lug or stud of the claw comes out of the small recess and is turned by its own spring to its previous position.

BRIEF DESCRIPTION OF THE DRAWINGS

Other details of this mechanism, as well as of the other components which are claimed by this specification, are illustrated in detail on the accompanying sheets of drawings, in which the following are represented:

DETAILED DESCRIPTION OF THE PREFERRED EMBODIMENT(S)

Figure 1:
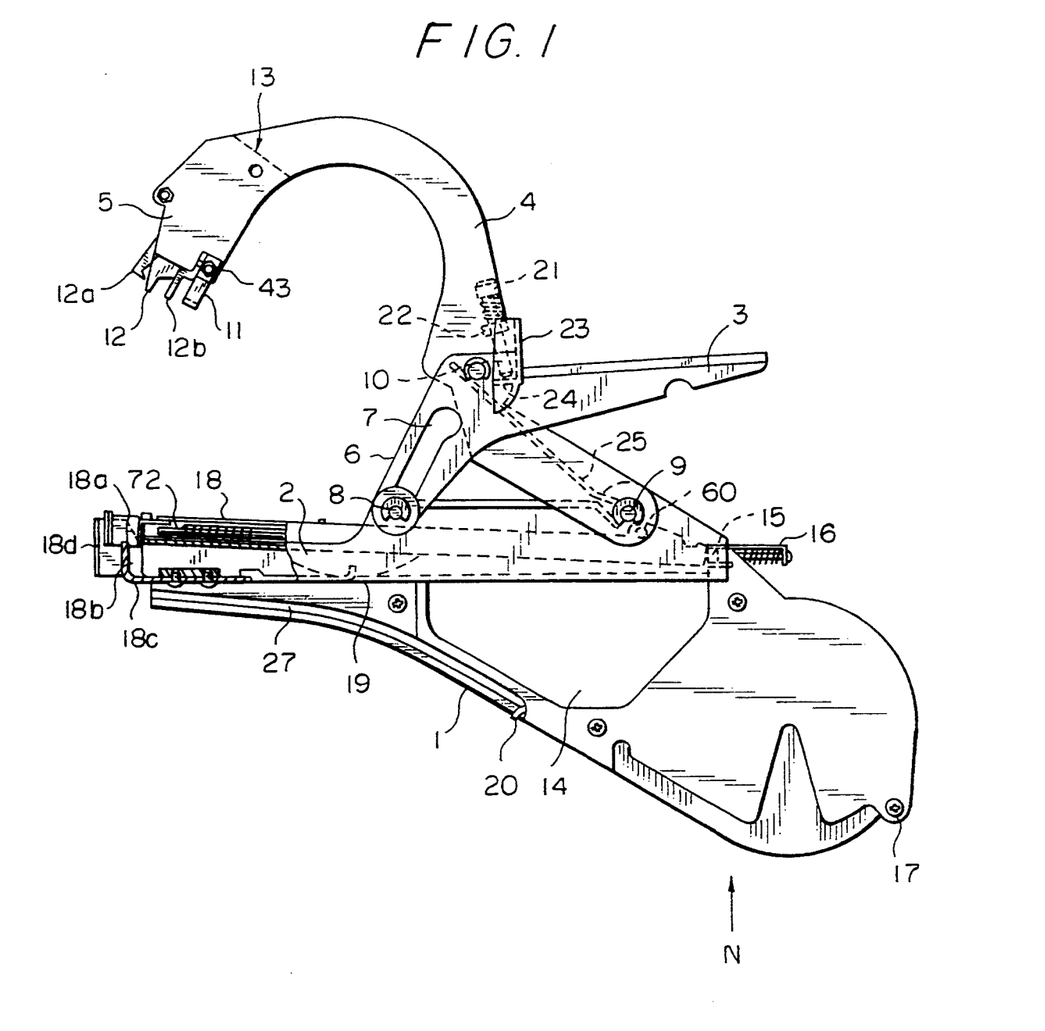
FIG. 1 represents an elevation of a tape stapler with the pivoting arm in the open position.
Figure 2:
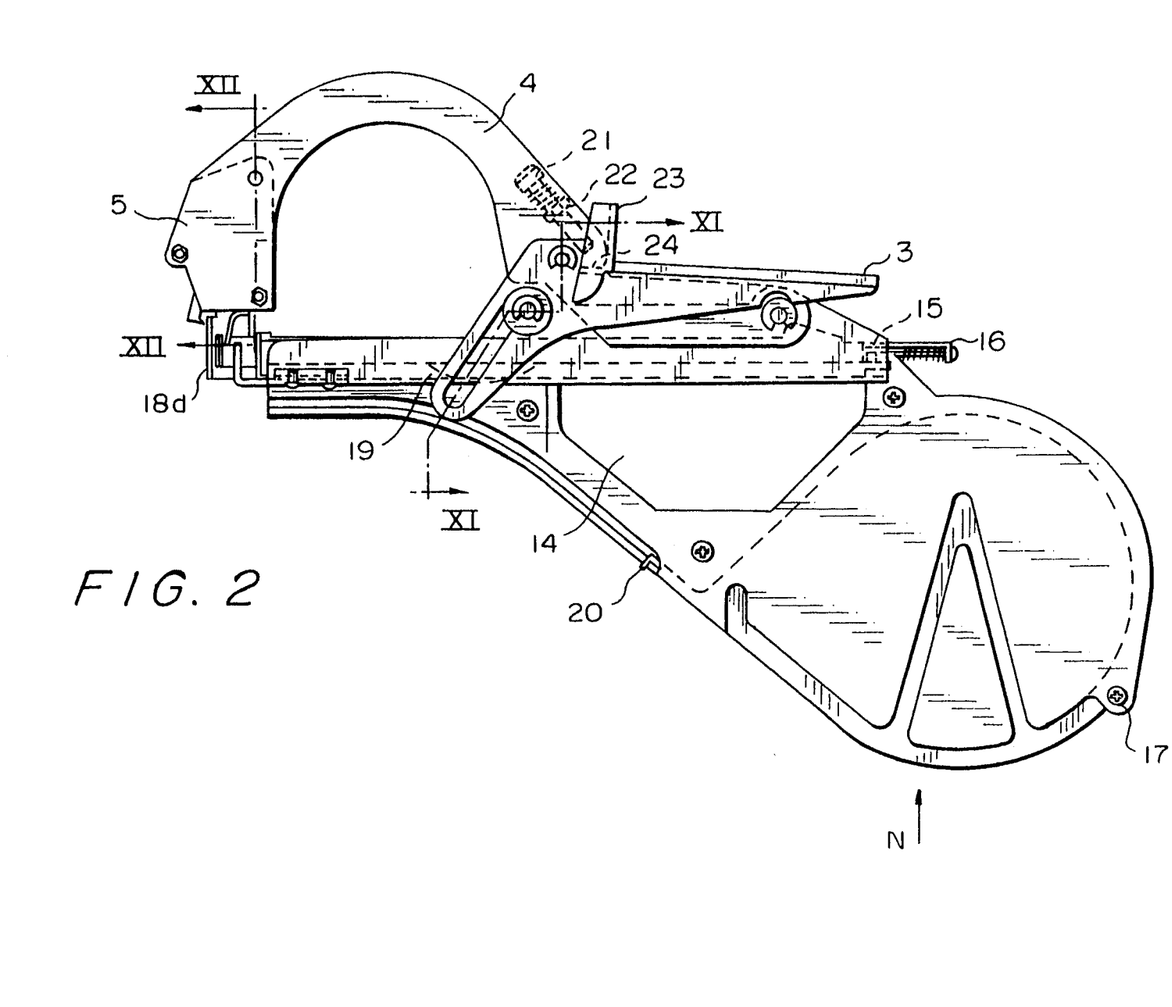
FIG. 2 represents the elevation of the tape stapler with the pivoting arm in the closed position. This tool differs from the above in the capacity of the container for the reel of tape.

In accordance with FIGS. 1 and 2, we can observe the tool with the lower body (1) and the framework (2) situated on top of it. The reel of tape occupies the right portion of the lower body (1) and runs along the interior of the groove (27) towards the front part of the framework (2) just behind the vertical wall (18d) which forms the forward end of the framework. In the interior of the framework (2) appears the staple loader (18) raised by the action of the spring (19) over its rear shaft (60) situated between the wings of the framework.

In the forward area of the framework (2), the vertical wall (18c) which takes in the toothed blade (18a) also appears; as well as the tongue (18b) to act as a support for the base of the staples when the arm (4) is lowered. On the framework (2) are situated the control lever (3,6) and the pivoting arm (4), respectively articulated at the shafts (8) and (9), and linked with each other at the upper shaft (10), with these three pivoting shafts being related by means of the spring (25), whose resistance has to be overcome in order to bring down the mechanism (5) of the arm (4), thus accumulating the potential energy needed for rapid return when the operator releases the pressure on the rear section (3) of the lever.

The pivoting arm is made up of two metal strips, arranged parallel to each other and secured by pins, which are not illustrated. Its forward end includes a mechanism (5) responsible for picking up the tape and pulling on it, as well as for acting as a base for the tape stapling operation.

On the lever, and more specifically in front of the rear section (3), we can observe the hand guard (23), whose outer parts clamp around the side pieces of the arm (4). This hand guard (23) has a foot (24) which extends towards the inside of the arm (4) and acts as the base for the lower end of the Allen screw (21) situated on the support (22), also housed in the interior of the arm (4).

Figure 10:
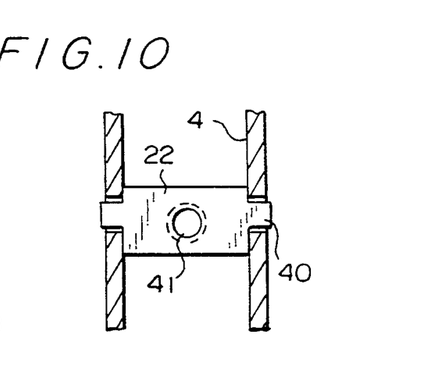
FIG. 10 is a top view of the support for adjusting the opening of the pivoting arm on the tape stapler.

The positioning of the support (22) on the arm (4) is shown in greater detail in FIG. 10. The protrusions (40) on the support (22) remain fixed in windows in the arm (4), as can be appreciated. The central hole (41) is tapped (screw-threaded) to receive the threaded section of the screw (21).

On opening, as in FIG. 1, the end of the screw makes contact with the foot (24) of the hand guard (23) in such a way that, according to the position of the said screw, the arm (4) opens to a greater or lesser degree to pull on the tape. To absorb these differences, the section (6) of the lever is provided with the slots (7).

Operating on the head of the screw (21) is sufficient to modify the opening of the arm (4), and to do this, a fixed spanner (Allen key) can be inserted between the two side members of the said arm (4).

The forward mechanism (5) of the arm (4) has in its lower section the pusher (12), the claw (12a), the square flange (12b) and the anvil (11 ), with the mechanism being fixed by means of bolts (43) and stretching from the line (13).

The two positions shown in FIGS. 1 and 2 represent, as is obvious, the tool in its open and closed positions, for which positions the operator's hand is situated over the rear part (3) of the lever and the fingers are inserted through the hollow or gap (14) in the lower body (1).

Figure 11:
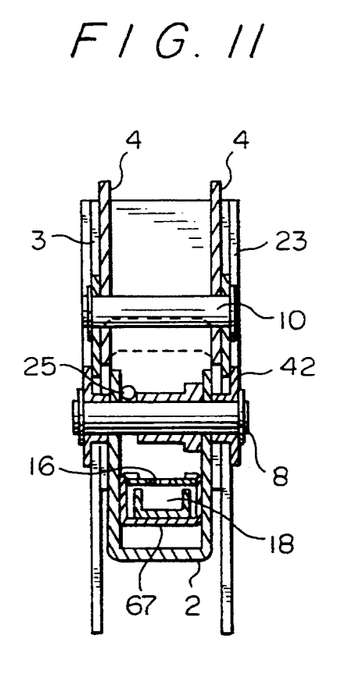
FIG. 11 corresponds to the cross-section II—II shown in FIG. 2.
Figure 12:
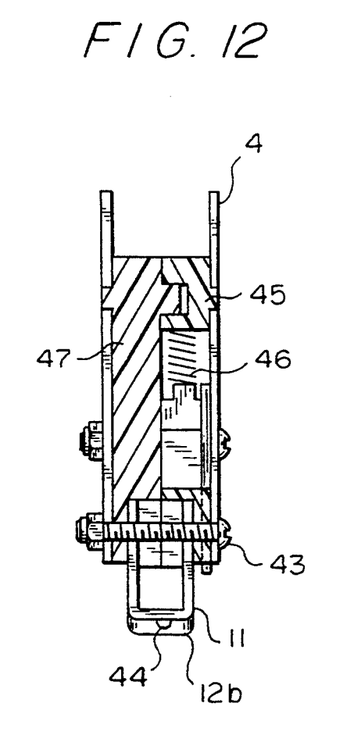
FIG. 12 shows the cross-section I—I in FIG. 2.

The cross-sections I—I and II—II shown in FIG. 2 are represented in FIGS. 12 and 11 respectively. In FIG. 11 we can appreciate the shape and the position of the hand guard (23) in relation to the lever (3) and the arm (4), as well as the position of the shafts (10) and (8) and the upper end (25) of the return spring. In this same view, we can observe the assembly of the staple loader (18) in connection with the framework (2), the pusher (16) and the guide (67). The same FIG. 11 also shows the pulley (42) on which the shaft (8) is mounted.

FIG. 12 shows the two plastic parts (47) and (45) that hold the mechanism (5) at the end of the arm (4). The part (47) is whole and compact and is secured to the internal wall of one of the side members of the arm while the other part (45) holds the constituting parts of the mechanism in its interior. The two parts (47) and (45) are secured to the arm (4) by means of pins or bolts (43), and between them are established recesses and projections that close the left face or side of the part (45) while the right is closed by one of the side members of the arm (4). The lower protruding parts of the anvil (11) and the square flange (12b) with its central hole (44) can be appreciated here.

Figure 13:
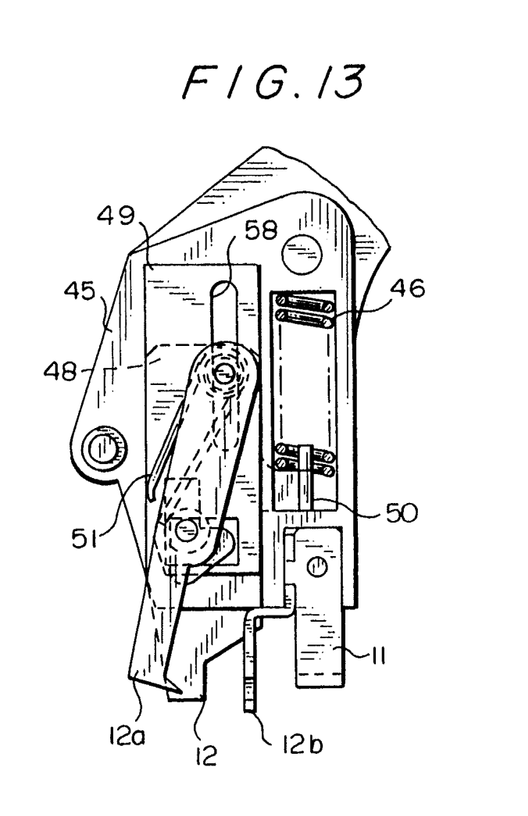
FIGS. 13, 14 and 15 represent three sequences of the mechanism at the end of the pivoting arm.
Figure 14:
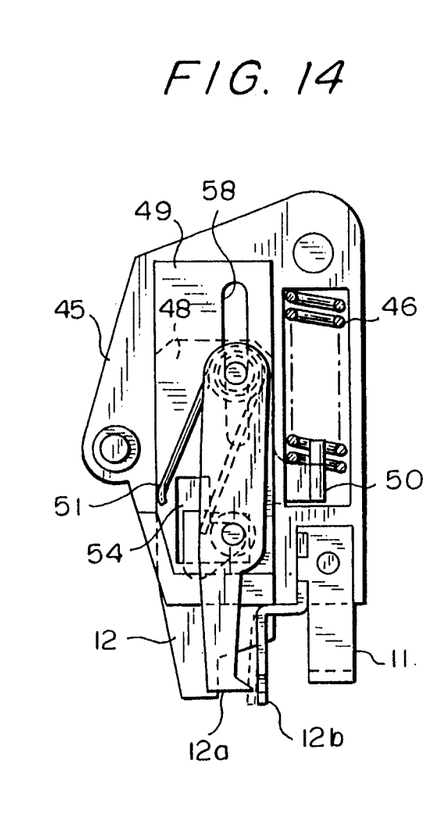
Figure 15:
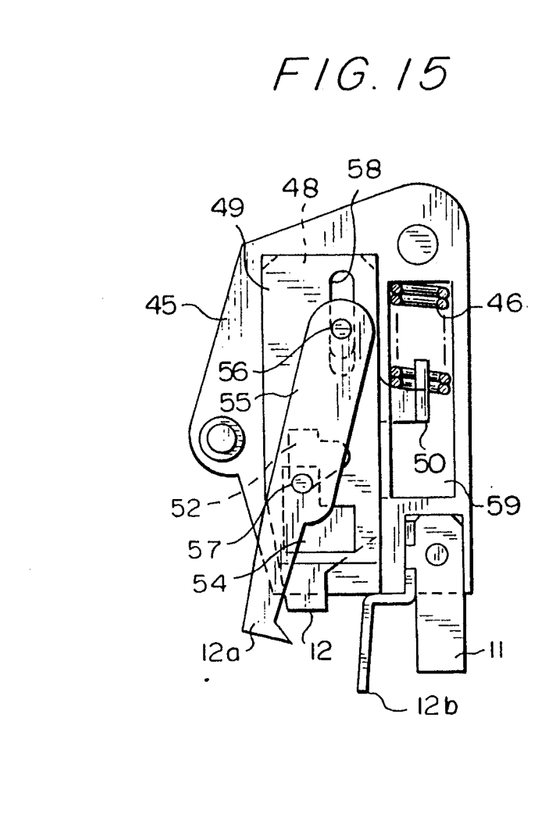

In FIGS. 13, 14 and 15, the mechanism (5) at the end of the arm (4) is shown in three positions: at rest, taking up tape with the first impulse of the arm against the stop (18d), and releasing and stapling the tape in the second impulse of the arm (4) against the said stop (18d).

All these views are taken from the forward face which corresponds to those shown in FIGS. 1 and 2 and to the right of FIG. 12.

Figure 16:
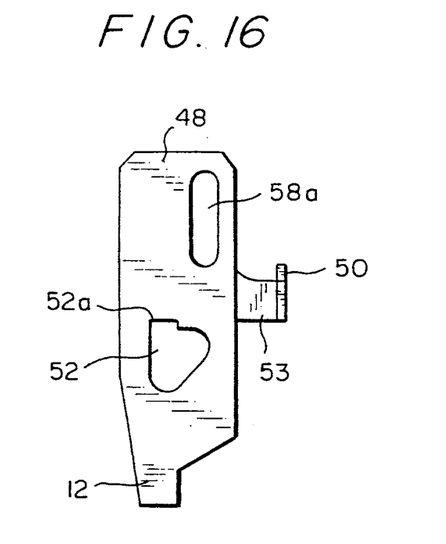
FIG. 16 is a plan view and elevation of the pusher of the mechanism.
Figure 16A:
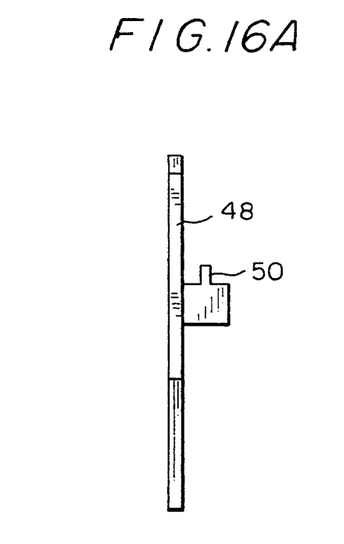

Inside the plastic part (45) are situated the helicoidal spring (46), the pusher (48,12), the claw (55,12a), the spring (51) for the claw as well as the two square parts, the flange (12b) and the anvil (11). The shape of the pusher (48), which is the least visible, is illustrated in two views in FIG. 16.

The part (45) has a hollow or gap (59) open on both its sides, in which is included the helicoidal spring (46) which in its lower area receives the protrusion (50) from the pusher (48). At the left of the hollow (59) are arranged two slots, one at each side of the part, separated by the wall (49). This wall includes the straight groove (58) and the "L?-shaped groove (54).

The pusher (48) moves in its slot in a vertical direction, whereas the claw (55) moves in the other slot in a horizontal direction, moving forward or backward with regard to the upper lug or stud (56).

The claw (55) is equipped with two lugs or studs, the upper one (56), which passes through the straight groove (58) until it becomes housed in the slot (58a) of the pusher (48), while the lower one (57) passes through the "L"-shaped groove and is housed in the slot (52) of the pusher (48). The spring (51), is arranged between the two lugs (56) and (57) and one side wall of the slot, so that it has a tendency to turn the claw towards the right.

In the position shown in FIG. 13, the assembly is at rest, with the claw outwards in relation to the square flange (12b), and the pusher (48) occupying its lowest position pushed by the helicoidal spring (46). The lower lug (57) of the claw (55) is housed in the section (52a) of the slot (52) for the pusher (48) as can be observed.

On the impact being produced between the end (12) of the pusher against the step (18d) of the framework, the pusher (48) is raised and puts pressure on the spring (46). As it is raised, the lug (57) becomes free and moves to the position shown in FIG. 14, urged by the spring (51), once that the pusher has descended again. Thus, the lower end (12a) of the claw (55) becomes housed in the hole (44) in the square flange (12b), taking up the tape and pulling on it when the arm (4) rises again, until the tape reaches the length of the opening or gap.

With the mechanism in this situation, continued impact of the pusher (12) against the stop (18d) on the framework (2) (FIG. 15) forces the pusher (48) upwards, at the same time as the tape is stapled and cut. Here the pusher (48) is raised and is compressing the spring (46). The lug (57) has passed along the hypotenuse of the triangular groove (52), turning the claw (55) towards the left, all of which is disposed to return to the position shown in FIG. 13, once that the spring has driven the pusher downwards again.

The square flange (12b) and the anvil (11) are housed in a stable manner in a recess in the part (45) which is open at the bottom, as can be observed.

Figure 3:
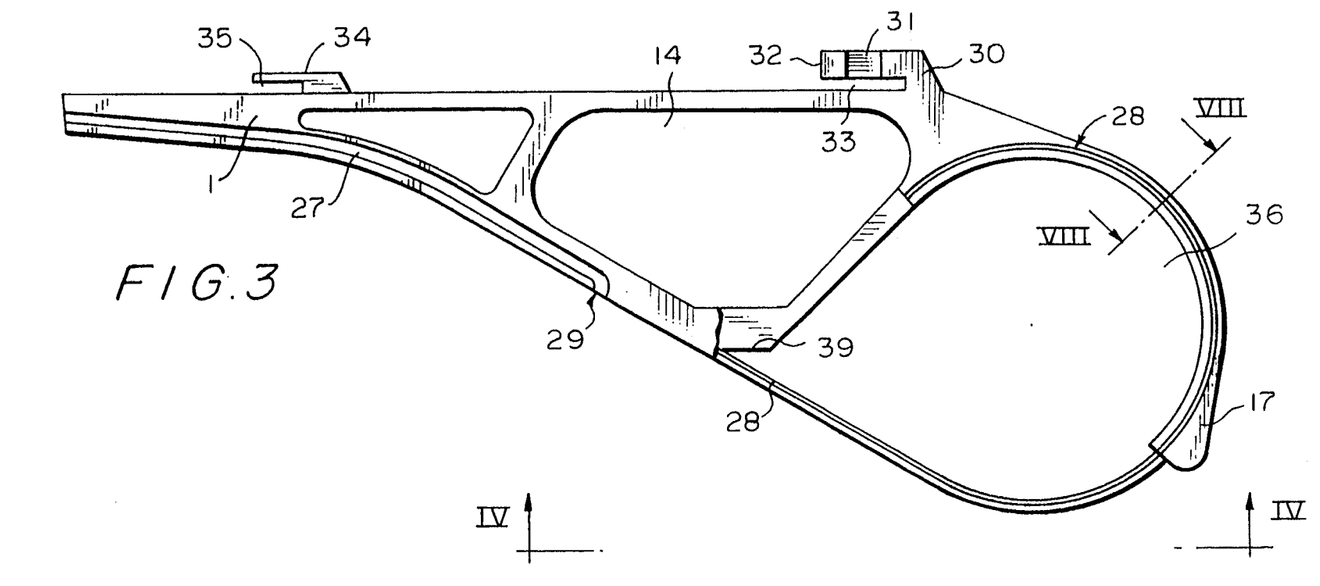
FIG. 3 is an elevation of the lower body.

The lower body (1) which is represented in FIG. 3, is almost triangular in shape and at its right end it is provided with a hollow or gap (36) which is open at the bottom and is accessible through a window or hole. In the middle area of the body (1) is the opening or gap through which the fingers can be inserted. From a position (29) until the left end, it is possible to observe the groove (27) used to receive and guide the tape coming from the reel housed in the hollow (36). This hollow (36) is closed from the position (29) until the rear stop (17), by a metal strip running along a pair of internal slots or grooves (28). Thus, the metal strip can be drawn back and concealed inside the hollow (36), leaving the entrance to the hollow free for the reel to be inserted, or else extended outwards to cover the said entrance.

On its top edge, the body (1) has two "L"-shaped projections (30) and (34), directed towards the left forward part and used to receive and fasten the base of the framework (2). The rear projection (30) has two recesses (31) and its forward sections are wedge-shaped (32), all of which is perfectly visible in FIG. 19.

Figure 4:
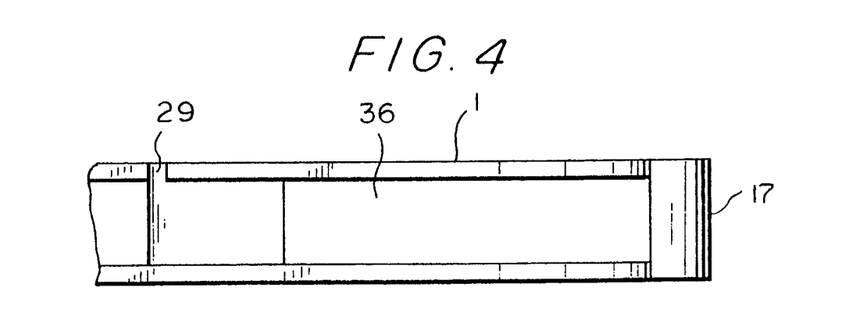
FIG. 4 is a local view, according to (N) in FIG. 3.

The entrance to the internal hollow (36) in the body (1) is shown in FIG. 4, which corresponds to section IV—IV indicated in FIG. 3, with the outer end (17) and the forward end (29) that mark the limits of the movements of the metal strip that slides along the slots (28).

Figure 5:
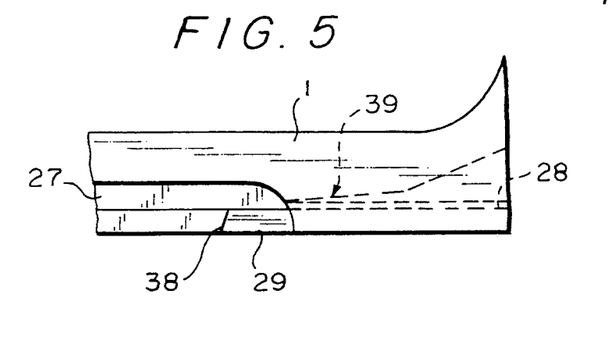
FIG. 5 is a top view of FIG. 4.

The passage for the metal strip from the store or container (36) to the groove (27) is perfectly defined in FIG. 5. The metal strip is brought to a stop by the wall (38) of the hollow (29), which it reaches by sliding along the guide slots (28). Close to the hollow or gap (29) it reaches the internal side wall (39), at an inclined plane, through which the tape from the reel runs after coming from container (36) and above the metal strip.

Figure 6:
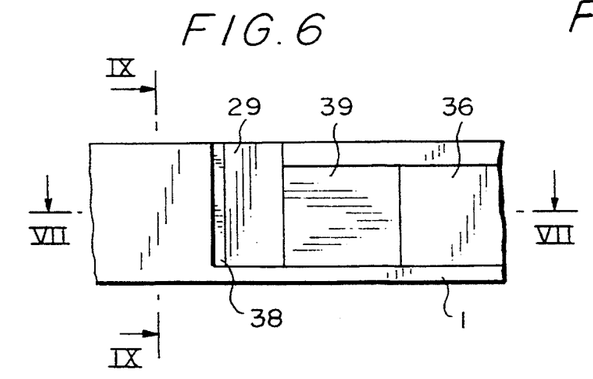
FIG. 6 is a bottom view of FIG. 5.
Figure 7:
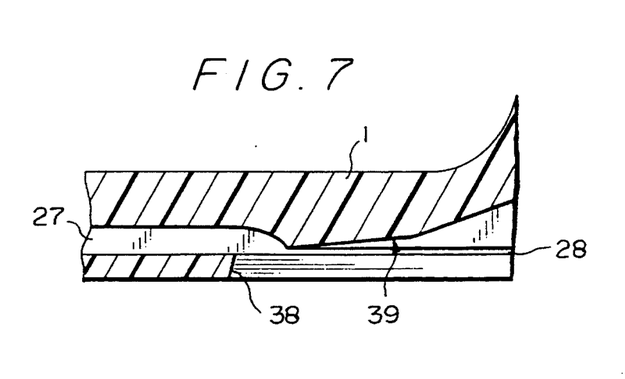
FIG. 7 is the cross-section view IV—IV in FIG. 6.

Section (39) is shown in FIG. 6 as an inclined plane until it reaches the stopwall (38) of the opening for the metal strip. The cross-section VII—VII in this FIG. 6, is defined in FIG. 7, in which the transition of the tape from container to the side groove (27) is perfectly visible.

Figure 8:
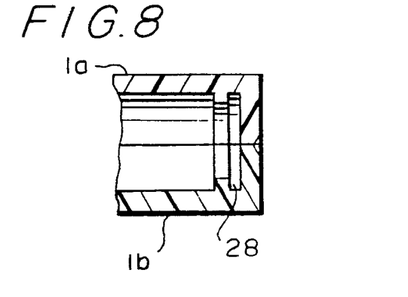
FIG. 8 corresponds to the cross-section III—III through the body (1) in FIG. 3.
Figure 9:
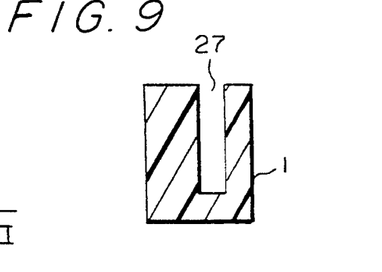
FIG. 9 is the cross-section view through V—V in FIG. 6.

The shape of the internal guide slots (28) for the metal strip can be observed in FIG. 8, which corresponds to the cross section VIII—VIII in FIG. 3. The two halves (1a) and (1b) of the lower body (1) are also shown here. In the same way, the shape and position of the groove (27) along which the tape runs throughout the body (1) appears in FIG. 9, which corresponds to the cross-section IX—IX in FIG. 6.

Figure 17:
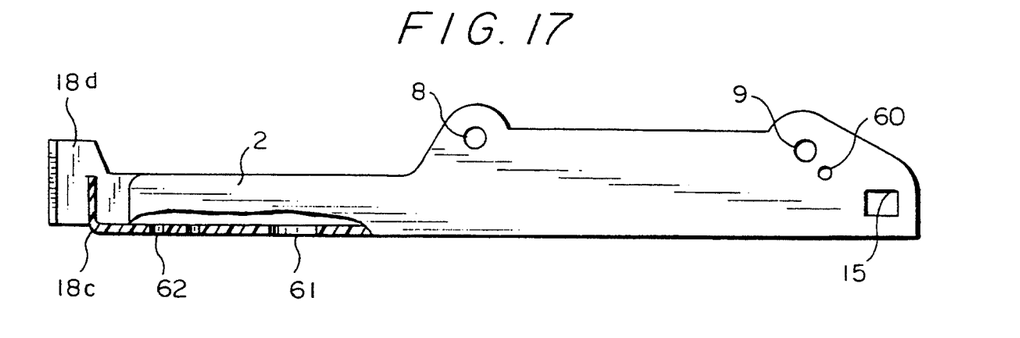
FIG. 17 is an elevation of the framework.

The framework (2) shown in FIG. 17 is a part with a "U"-shaped section, which at its forward area has a stop (18d) for the pusher (48) of the mechanism (5) at the end of the pivoting arm, and the vertical wall (18c) for the cutting blade (18a) to be positioned, as well as some forward holes (62) for the support tongue (18e) for the staples to be fastened in them.

In the base of the framework (2) can be seen the gap or hole (61) through which the forward projection (34) on the lower body (1) is inserted. In the rear section, we can observe the side windows (15) into which the wedges (32) of the rear projections (30) on the lower body (1) penetrate.

The wings of the framework also show similar pairs of facing or opposing holes (8) and (9) for positioning the shafts where the lift axes for the operating lever and the pivoting arm are situated, as well as another two facing holes (60) on which the rear part of the staple loader is fixed.

Figure 18:
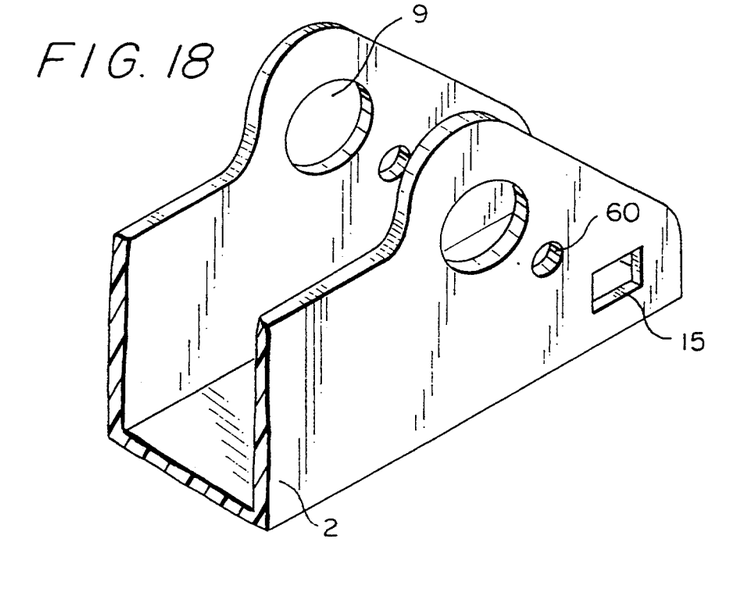
FIG. 18 represents a perspective view of the rear detail of the framework.
Figure 19:
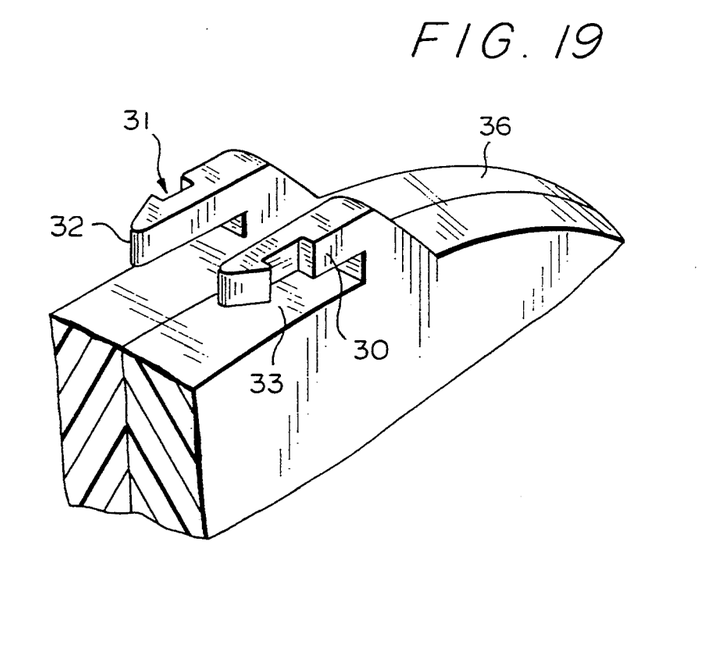
FIG. 19 shows, also in perspective, the upper rear part of the lower body of the tape stapler.
Figure 20:
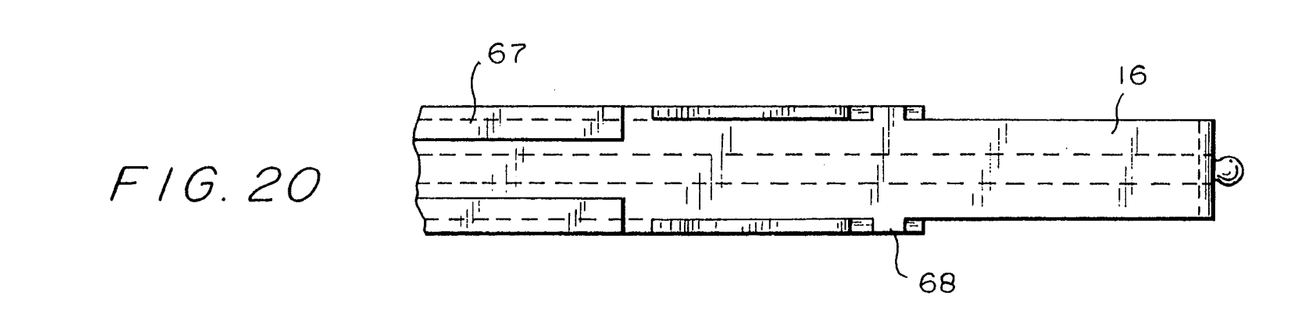
FIG. 20 is a rear detail of the staple loader.
Figure 21:
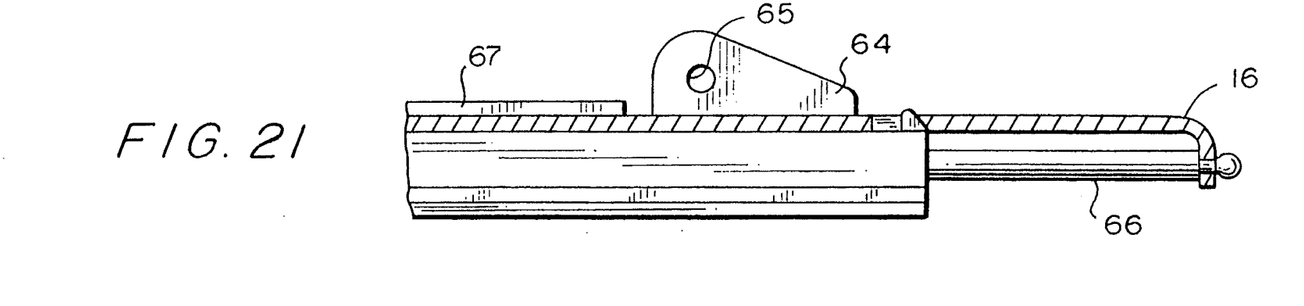
FIG. 21 is a cross-section view, seen from below, of FIG. 20.
Figure 22:
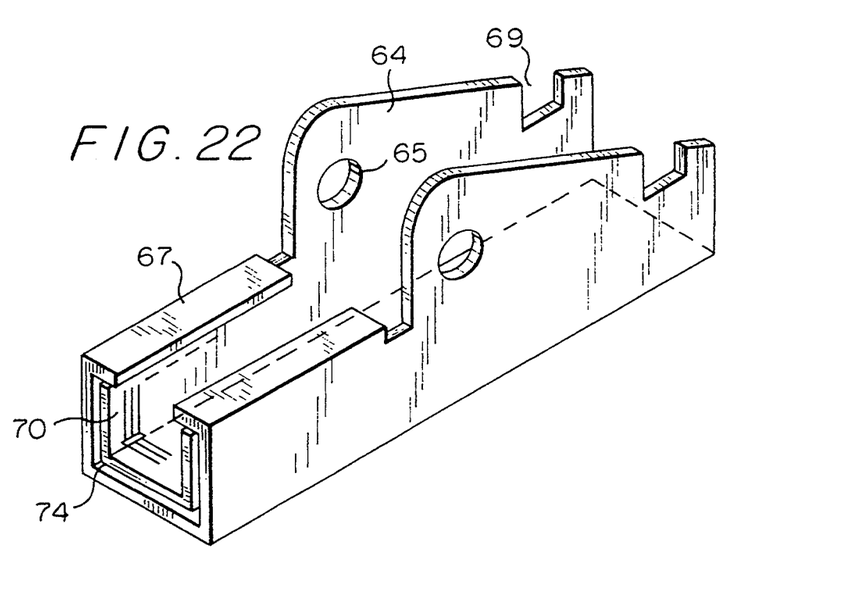
FIG. 22 is a perspective view of the rear part of the staple loader.

The rear part of the framework (2) and of the upper section of the lower body (1) can be appreciated in figs. 18 and 19, in whose perspectives we can observe the specific shape of the rear projections on the lower body (1). On housing the framework (2) over the lower body (1), the wedges (82) penetrate into the windows (15) in the framework (2) and the projections are made to fit tightly by receiving the thickness of the said framework in the gap (33) below the projections (30). The thickness of the framework (2) is also received in the gap (35) below the forward projection (34) on the top of the lower body (1), all of which can be appreciated in FIGS. 1 and 2.

To release the framework (2) from the lower body (1) it will be sufficient to press the ends of the wedges (32) on the projections (30) inwards and pull the framework (2) forward. In FIGS. 20, 21, 22 and 28 we wish to point out the guide part (67), inside which the rail (74) can be observed, which receives the staples (70) in its interior, as well as the pusher unit (16) shown in FIG. 23. The rear part of the guide (67) is provided with two side elevations (64) equipped with aligned holes (65) to allow a shaft in holes (60) to pass through and so secure this part to the framework (2).

Figure 23:
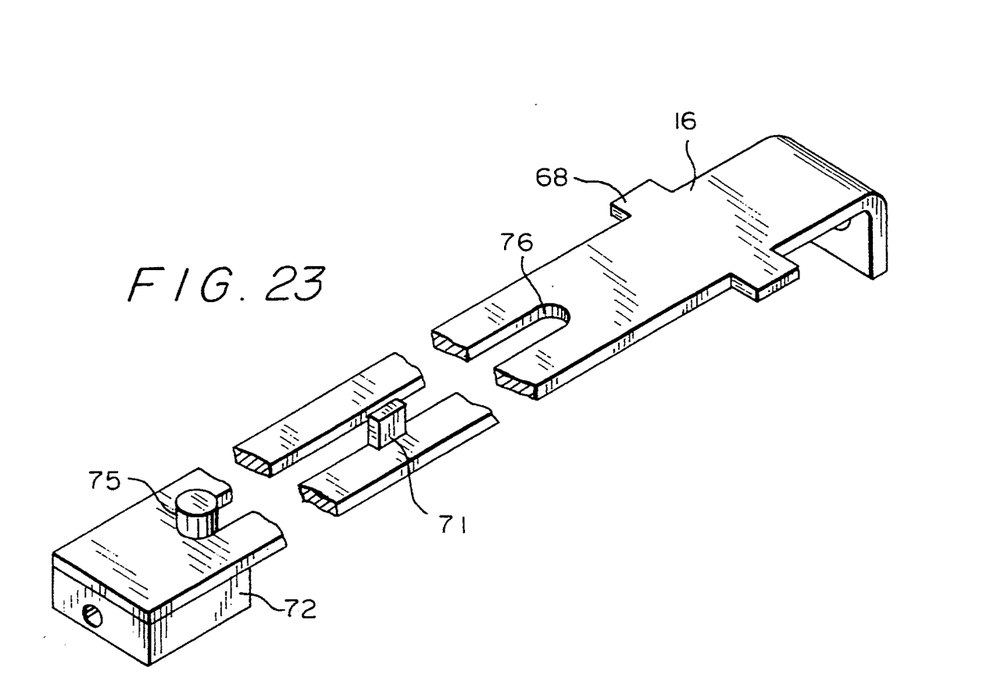
FIG. 23 is a perspective of the pusher strip for the staples.

The ends of the wings of this guide are folded inwards horizontally in order to receive the pusher unit. The pusher unit is made up of the metal strip (16) itself, with its rear folded end, in which the rod (66) surrounded by a spring, shown in FIGS. 1 and 2, is secured. The end of the rod receives the pusher block (72) itself, provided with an upper stud (75) which travels along the slot (76) in the metal strip (16).

The invention includes the provision of the raised foot (71) formed on the slot (76), which, on extracting the metal strip (16) in order to load the staples, comes into contact with the shaft in holes (60) an the holes (65) in the guide, thus preventing the said metal strip from being fully extracted and with the loading of staples being carried out through the forward part of the loader (18).

Fixing of the metal strip (16), once that the staples have been loaded, is carried out by means of the side wings (68), which are inserted into the notches or windows (69) in the guide (67).

I claim:

1. A tape stapler comprising a lower body (1) having a rear container for a reel of tape and a channel for feeding tape from said reel to a forward part of the body (10), a framework (2) fastened to the body (1) having a control lever (3), a pivoting arm (4), a staple loader (18), a mechanism (5) at an end of the arm (4) that engages a stop (18d) and a cutting blade (18a) at a forward part of the framework (2), said mechanism (5) having a pusher (48), a claw (55), a square flange (12b) and an anvil (11), wherein the lower body (1) has an opening on the periphery of the body which gives access to a container (36) to receive the reel of tape, said container having internal slots (28) engaging a first metal strip which opens and closes the opening and is limited by a rear stop (17) and a transverse front wall (38), the lower body having a side groove (27) open towards an exterior of the lower body to carry the tape forward, an internal wall (39) in the container (36), which is inclined in relation to the alignment of the internal slots (28), below which the tape passes and is pressed by the metal strip depending on a position of the first strip in relation to the wall (38), a forward projection (34) and a rear projection (30), each extending from a top edge of the body, said forward projection and said rear projection being "L"-shaped and directed towards the forward part of the body (1), and forming a recess with the body (1) in which a thickness of a base of the framework (2) is received, the rear projection (30) comprising two projections, each of which has a wedge (32) and a recess (31), the framework (2) having in a "U"-shaped cross-section with a forward hole (61) in a base and two facing rear windows (15) in wings of the "U"-shaped section, the forward projection (34) being engaged in the forward hole (61) and each wedge (32) of the two projections respectively engaged in the windows (15), a staple loader (18) having a "U"-shaped guide (67) with two rear windows (69) open upwards in opposite wings of the guide (67), and a closure part slideably engaged in the guide (67), the closure part having a pair of lugs (68) on a second metal strip (16) engaged in the two rear windows (69), and a forward foot (71) which on opening strikes a pin on the guide (67) preventing removal of the closure part from the guide (67), the control lever (3) having a front arm with elongated slots (7), a shaft (8) engaged with the framework (2) slideably mounted in said elongated slots (7), a hand guard (23) fixed to said lever (3) having a lug (24) which is fitted in the interior of the arm (4), said lug supporting the end of an Allen screw (21), which passes through a screw-threaded support (22) secured to the interior of the arm (4), a return spring (25) with a base wound around a shaft (9) engaged with the framework (2) on which the arm (4) turns, and with one wing of a pair of wings of the spring being positioned above said shaft (8) on which the lever (3) turns and another wing of the pair of wings placed below a shaft (10) around which the lever (3) and the arm (4) are rotatably engaged, the pivoting arm (4) having two parallel metal plates connected by pins or bolts, between whose forward ends is situated the mechanism (5), the mechanism (5) having the pusher (48) with a straight groove (58a), a triangular groove (52) with an upper recess (52a) and a protrusion (50), the mechanism having a claw (55) situated parallel to the said pusher (48) provided with two studs (56, 57), said pusher (48) and the claw (55) respectively situated inside pusher slots cut in sides of a plastic part (45), a wall (49) which is mounted between the pusher slots being provided with one straight vertical groove (58) and one "L"-shaped groove (54) through which the studs (56, 57) of the claw (55) pass to become respectively housed in the straight groove and the triangular groove of the pusher (48).

2. The tape stapler in accordance with claim 1, wherein the pusher (48) moves in a vertical direction, ascending and descending, in an interior of one slot of said pusher slots in said plastic parts, with the protrusion (50) housed in a base of a helicoidal spring (46) engaged in a hollow in the part (45) which forces the pusher (48) downwards.

3. The tape stapler according to claim 1, wherein the claw (55) has a lateral and a vertical movement in an interior of the other slot of said pusher slots in said plastic part and is connected to a spring whose base wraps around an upper stud (56) of said studs, one arm of said spring slideably engaged on a wall of the other slot and another arm of said spring slideably engaged to a lower stud (57) of said studs.

4. The tape stapler according to claim 1, wherein the support (22) has two lugs (40) which are respectively engaged in a window on each side member of the arm (4), said support (22) having a central tapped screw-threaded hole through which the adjustment screw (21) passes.

5. The tape stapler according to claim 1, wherein the two projections (30) on the upper part of the body (1) are flexible.

6. The tape stapler according to claim 1, wherein the end of the first metal strip has a protrusion on each free end which respectively act as a contact with the stops (38, 17) on the body (1) when said first strip is opened and closed.

* * * * *